W. H. NANCE.
TIRE.
APPLICATION FILED JAN. 30, 1914.
1,127,077.
Patented Feb. 2, 1915.
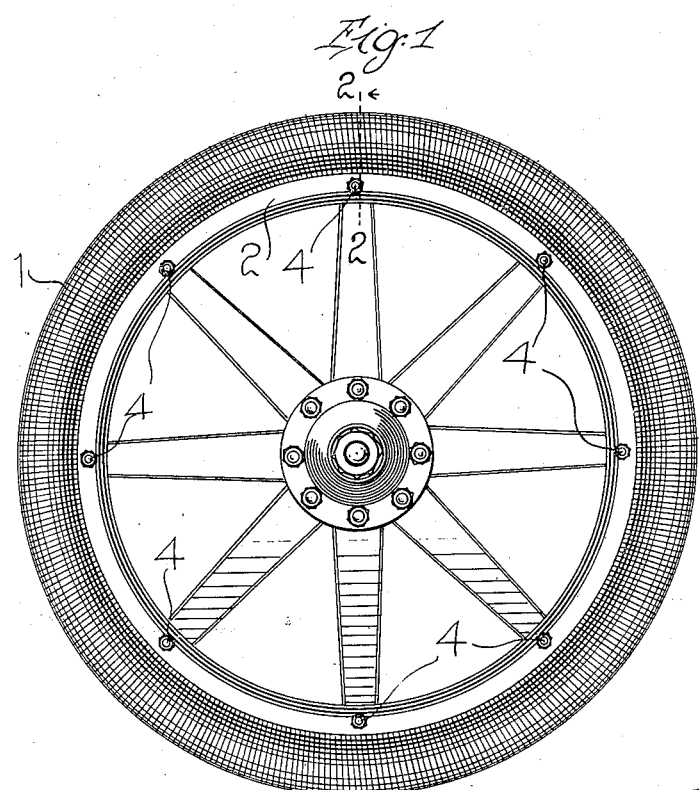
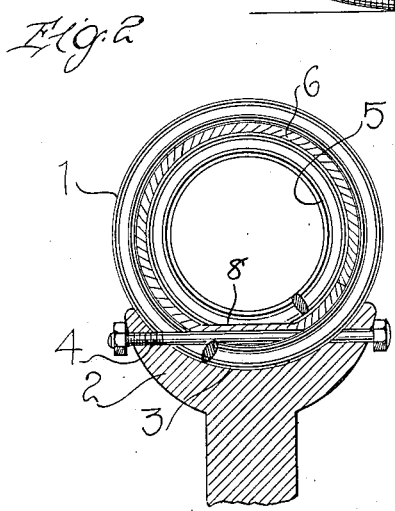
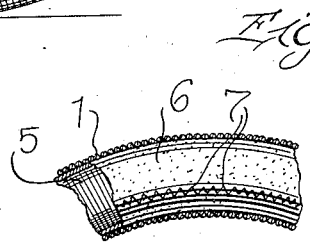
Inventor
W. H. NANCE
By Watson E. Coleman
Attorney
Witnesses
Robert M. Sutphen
A. L. Hind

UNITED STATES PATENT OFFICE.

WILLIAM H. NANCE, OF OTTAWA, KANSAS, ASSIGNOR OF ONE-HALF TO E. PEMBER, OF OTTAWA, KANSAS.

TIRE.

1,127,077. Specification of Letters Patent. Patented Feb. 2, 1915.

Application filed January 30, 1914. Serial No. 815,488.

*To all whom it may concern:*

Be it known that I, WILLIAM H. NANCE, a citizen of the United States, residing at Ottawa, in the county of Franklin and State of Kansas, have invented certain new and useful Improvements in Tires, of which the following is a specification, reference being had to the accompanying drawings.

This invention relates to certain improvements in tires; and the object of the invention is to provide a device of this general character having novel and improved means whereby a cushion tire is afforded which is free of the disadvantages of the ordinary inflatable tire.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in side elevation of a wheel having applied thereto a tire constructed in accordance with an embodiment of my invention; Fig. 2 is a transverse sectional view, on an enlarged scale, taken on the line 2—2 of Fig. 1; and Fig. 3 is a fragmentary longitudinal sectional view taken through the tire as herein included.

As disclosed in the accompanying drawings, 1 denotes an outer spirally coiled spring adapted to be arranged circumferentially of a wheel felly or rim, as indicated at 2, said felly having a periphery thereof concaved, as indicated at 3 in the accompanying drawings, to provide a seat for the convolutions of the spring 1 and such spring is suitably secured to the felly or rim in any manner desired or preferably by bolts, as at 4. Arranged within the convolutions of the spring 1 is a second spirally coiled spring 5 coöperating with the spring 1 to assure the desired peripheral cushion for the wheel and, as herein set forth, I find it of advantage to inclose the second or inner spring 5 within a casing 6 of leather or other requisite flexible material, which casing 6 serves to afford a cushion between the convolutions of the springs and also affords a means whereby dirt is prevented from caking or choking the springs in such a manner as to prevent the same from properly performing their required functions. It is to be observed that the bolts 4 are disposed transversely of the felly 2 and are directed through the free marginal portions thereof and tend to force, as indicated at 8, the casing 6 between the convolutions of the inner spring 5 whereby it will be perceived that such inner spring 5 is maintained in a fixed position relative to the outer spring 1.

While I do not wish to be limited as to the manner in which the casing 6 may be applied to the spring 5, I prefer to employ the conventional arrangement of lacing, as indicated at 7. While it will be readily perceived that a tire constructed in accordance with an embodiment of my invention assures a ready and convenient cushion for the wheel, it is also to be observed that the convolutions of the spring 1 afford a convenient means whereby slipping or skidding of the vehicle is effectively prevented.

From the foregoing description, it is thought to be obvious that a tire constructed in accordance with an embodiment of my invention is of an extremely simple and comparatively inexpensive nature and is particularly well adapted for use by reason of the convenience and facility with which it may be assembled and applied in operative position and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with a wheel felly having the periphery thereof concaved, a tire positioned within the concave of the rim and comprising an outer coil spring and an inner coil spring, a flexible casing inclosing the inner spring, and bolts directed through the felly in interlocking engagement with the convolutions of the outer spring and forcing the casing between the convolutions of the inner spring.

In testimony whereof I hereunto affix my signature in the presence of two witnesses.

WILLIAM H. NANCE.

Witnesses:
 WM. B. WALKER,
 J. F. MIDDLETON.